April 18, 1939.                H. M. BIELE                2,155,113
                             SCANNING DEVICE
                           Filed Feb. 10, 1938

INVENTOR
HARRY M. BIELE
BY James N. Curtin
ATTORNEY

Patented Apr. 18, 1939

2,155,113

UNITED STATES PATENT OFFICE 2,155,113

SCANNING DEVICE

Harry M. Biele, Hollis, N. Y., assignor to Associated Press, New York, N. Y., a corporation of New York Application February 10, 1938, Serial No. 189,773

7 Claims. (Cl. 178—7.1)

This invention relates to a scanning device for picture transmission systems and the like.

An object of the invention is to provide a simple, compact, and highly efficient photo electric scanning arrangement.

Figure 1:
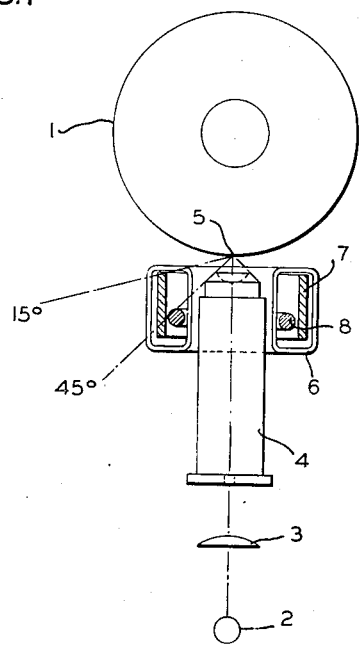
Figure 2:
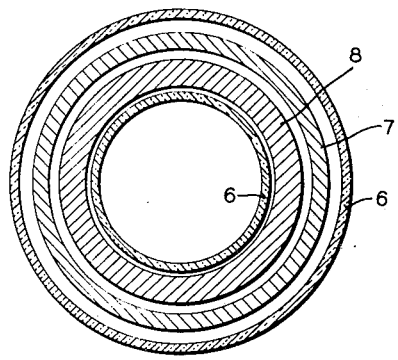

Other objects will appear in the following description given with the aid of the accompanying drawing of which Figure 1 is a schematic view of the scanning device, partly in section;

Figure 2 is a horizontal section of the photo electric cell used in connection with the present invention.

Referring now to Figure 1 of the drawing:

The reference character 1 indicates a scanning cylinder about which the picture is wrapped. Light from a light source 2 shines through a condenser lens 3, through an optical system enclosed in a metal tube 4 which projects the light onto the surface of the cylinder at the point 5. A diffused light varying in intensity according to the shading of the elemental tone areas of the picture is reflected onto the cathode of a photo electric cell of novel construction, now about to be described.

Heretofore, it has been customary to use various arrangements of mirrors for collecting the diffused light from the picture being scanned, but it has been found that such systems are needlessly inefficient in that a considerable amount of light is absorbed by the reflecting mirrors.

In the present invention, the objective of the optical system may be placed in close proximity to the picture, making it possible to use a highly efficient short focus lens assembly. The optical system extends through a photo electric cell consisting of a glass envelope 6 in which is a tubular cathode 7 and a concentrically disposed ring shaped anode 8. Any suitable mounting means may be used for supporting the parts referred to. By referring to the drawing it will be seen that the diffused light, in the present embodiment, reflected at from 15 to 45 degrees will fall directly on the cathode of the photo electric tube which may be placed in very close proximity to the pencil of light impinging on the cylinder at 5, resulting in a very simple and efficient scanning system with no light loss.

The arrangement disclosed has a further important advantage in that the metal casing of the optical system effectively shields the elements of the photo electric cell from stray light rays which might strike the glass envelope in the event that the scanning light were projected through the cell from some point beyond the cell.

What is claimed is:

1. In a scanning apparatus, a tubular photo electrical cell, an opaque tube supporting an optical system extending through said cell, the arrangement being such that the elements of said photo electric cell are concentrically disposed in respect to said tube.

2. In a scanning apparatus, a tubular photo electrical cell, a source of scanning light, means comprising an optical system for projecting a scanning ray from said source, and means for shielding the elements of said cell from stray light rays comprising an opaque tube containing elements of said optical system extending into the central opening of said cell.

3. In a scanning apparatus, a tubular photo electric cell and an optical system supported in an opaque tube extending substantially through the open mid section of said cell.

4. In a scanning apparatus, a photo electric cell comprising an annular glass envelope, a tubular cathode concentrically disposed therein, an anode adapted to cooperate with said cathode, a source of scanning light, an optical system for projecting said scanning light, an opaque tube containing elements of said optical system extending into the central opening of said glass envelope.

5. In a scanning apparatus, a tubular photo electric cell, an optical system extending through the central opening in said cell, the arrangement being such that the objective of said optical system is substantially aligned with the edge of one of the elements of said cell.

6. In a scanning device, a photo electric cell having an envelope with the outer surface thereof shaped to approximate that of a cylindrical pipe, and a tube containing an optical system extending into the central bore of said envelope.

7. In a scanning device, a photo electric cell having an envelope with the outer surface thereof shaped to approximate that of a hollow cylinder, and a sube containing an optical system extending into the central bore of said envelope.

HARRY M. BIELE.